United States Patent [19]

Nakao et al.

[11] 3,781,170

[45] Dec. 25, 1973

[54] LIGHTWEIGHT METAL COMPOSITE MATERIAL AND PROCESS FOR PRODUCING SAME

[75] Inventors: Masaaki Nakao, Urawa; Zenya Shiiki; Yasuo Amagi, both of Tokyo, all of Japan

[73] Assignee: Kureha Kagaku Kogyo Kabushiki Kaisha, Tokyo, Japan

[22] Filed: July 15, 1971

[21] Appl. No.: 165,780

[30] Foreign Application Priority Data

July 17, 1971 Japan.................................. 46/62114
Aug. 10, 1971 Japan.................................. 46/69218

[52] U.S. Cl..................... 29/182.5, 29/182, 75/200, 75/201, 75/211, 75/222, 75/226
[51] Int. Cl.................................................. B22f 7/00
[58] Field of Search...................... 75/200, 201, 211, 75/222, 226; 29/182, 182.5

[56] References Cited
UNITED STATES PATENTS

| | | | |
|---|---|---|---|
| 3,264,073 | 8/1966 | Schmitt................................. | 29/182 |
| 3,052,967 | 9/1962 | Fischer.............................. | 75/222 X |
| 3,528,809 | 9/1970 | Furnand et al. ...................... | 75/222 |
| 3,137,927 | 6/1964 | Huegel et al...................... | 75/206 X |
| 3,129,497 | 4/1964 | Johnston et al.................... | 75/206 X |
| 2,935,396 | 5/1960 | Pashak............................. | 75/222 X |
| 3,342,563 | 9/1967 | Butts................................. | 75/222 X |
| 3,383,207 | 5/1968 | Butts................................. | 75/222 X |
| 3,336,134 | 8/1967 | Kulp et al. ......................... | 75/201 X |
| 3,214,270 | 10/1965 | Valyi..................................... | 75/201 |
| 3,135,044 | 6/1964 | Mote et al. ............................ | 29/183 |
| 2,806,509 | 9/1957 | Bozzacco et al.................... | 29/182.5 |

*Primary Examiner*—Carl D. Quarforth
*Assistant Examiner*—R. E. Schafer
*Attorney*—Lane et al.

[57] ABSTRACT

A lightweight metal composite material having hollow microspheres homogeneously dispersed in a light metal selected from the group consisting of aluminum, aluminum-base alloys and magnesium-base alloys. The hollow microspheres are composed of a material which is capable of withstanding the sintering temperature of the light metal, for example, a carbonaceous material such as carbon or graphite, a ceramic such as hard glass, a natural glass or silica or a metal such as copper, nickel or iron. The surface of the granular hollow microparticles are coated with the light metal, and sintered during or after a pressure shaping treatment. Alternately the mixture may further be mixed with a thermocurable binder.

9 Claims, No Drawings

LIGHTWEIGHT METAL COMPOSITE MATERIAL AND PROCESS FOR PRODUCING SAME

BACKGROUND OF THE INVENTION

This invention relates to a porous lightweight metal composite material comprising a metal or alloy and dispersed hollow microspheres of a material capable of withstanding the sintering temperature of the metal or alloy and to a process for producing the metal composite material.

In recent years, ultralightweight metallic materials have been used as curtain wall, sound-proof board and thermal insulating material in skyscrapers and as structural material in aircraft, automobiles and other vehicles. In the past porous light metals, for example, those foamed by gas, and foamed plastics plated with light metals have been used in such applications. However, foamed metals are generally deficient in strength and have unsatisfactory thermal-insulating properties, because they have communicated cells (open celled). Foamed plastics plated with a metal, are unsatisfactory in high temperature applications because their plastic substrate is susceptible to thermal decomposition.

Accordingly, it is an object of this invention to provide economical ultra-lightweight metallic materials which have excellent strength and heat-resisting properties and which have good thermal-insulating and sound proofing properties.

SUMMARY OF THE INVENTION

It has now been found that a porous lightweight metal composite material which overcomes the previously mentioned deficiencies can be produced by sintering a mixture of aluminum, aluminum-base alloy or magnesium-base alloy and hollow microspheres of a material which withstands the sintering temperature.

The porous lightweight metal composite material of this invention is characterized by having a structure similar to the so-called syntactic foams. The heat-resisting hollow microspheres are homogeneously dispersed in a continuous phase of metal or alloy. The lightweight metal composite materials of the present invention posses extremely high specific compression strength (compression strength/density) and excellent thermal-insulating and sound proofing properties and, moreover, are impermeable.

DESCRIPTION OF THE PREFERRED EMBODIMENTS

Metals that may be used as a continuous phase of the composite of the present invention as previously mentioned include aluminum and aluminum- or magnesium-base alloys. In the case of alloys, aluminum or magnesium may preferably be contained therein in an amount of at least 70 percent by weight. The aluminum-base alloys include aluminum-magnesium, aluminum-silicon, aluminum-manganese, aluminum-copper, aluminum-silicon-magnesium, aluminum-magnesium-maganese, while the magnesium-base alloys include those containing, for example, a small amount of aluminum, zinc, manganese and silicon.

As described above, the heat-resisting hollow microspheres to be mixed with such metal are those of a materials capable of withstanding the sintering temperature (in general, this temperature is above 500°C.) of the metal powders used, For example, hollow miscrospheres having a diameter of at most 2 mm, a particle density of at most 1 (g/cc) and a hydrostatic pressure-resisting strength of at least 1.0 kg./cm$^2$ and composed of a carbonaceous material such as carbon or graphite preferred. Other suitable materials for the microspheres include ceramics as hard glass, natural glass, silica or alumina; and metals such as copper, nickel or iron. Suitable hollow carbon microspheres and a process for producing same are disclosed in our U.S. application Ser. No. 147,712, filed May 27, 1971, the teachings of which are herein incorporated by reference.

A variety of means may be used for mixing the metal with the hollow microspheres. When the metal used is in the form of fine particles having an average particle size of 100 $\mu$ or less, the metal is dry-mixed with the hollow microspheres by the aid of an ordinary mixer. Advantageously used for this treatment are, for example, such mixers as V-shape mill, swing mill, vibration mill, conical mill, kneader and Henshell mixer, etc. When the metal used is in the form of coarse granules, lumps, plates or rods, the metal is preferably treated in a steel melt-stirrer where the metal is melted and mixed with the hollow microspheres so that the surface of the hollow microspheres become coated with the metal. When the hollow microspheres used are composed of a carbonaceous material, it is desirable to perform said melt mixing treatment in vacuum or in an atmosphere of a non-oxidizing gas such as argon, hydrogen or helium.

In the mixing treatment, the surface of the hollow microspheres may be treated to improve wetting with the metal thereby improving adhesion and the quality of end products. Treatment with a metal salt flux is suitable for such pretreatment. The pre-treatment temperature is not critical but is usually carried out at a temperature below 400°C. Metal salts utilizable for the treatment include chlorides or fluorides of alkali metals, alkali earth metals and aluminum, among which $ZnCl_2$, $NaF/AlF_3$, $AnCl_2/NaCl$, $AlF_3/NaF/KCl/NaCl$ are preferred. These metal salts may be used in the form of a mixture of two or more having a lower melting point than the microspheres or in the form of a solution in a solvent such as water or an alcohol. When the hollow microsphere used are composed of a non-metallic substance, the pre-treatment may be carried out by electrical or chemical plating of the surface of the hollow particles with copper or nickel and, if desired, further applying the previously mentioned treatment to the plated surface.

The mixing ratio of the metal to the hollow microspheres depends on the desired product strength and density and on the nature of the hollow microspheres used. However, the metal must be present at least in the amount necessary to satisfactorily fill the interstices between the hollow microspheres Experiments show that a metal to microsphere volume ratio of at least 15/85 is necessary for imparting adequate strength to the product.

Another embodiment of the present invention involves the use of a mixture of the metal and the hollow microspheres into which a thermocurable binder is further incorporated. An advantage of the use of a thermocurable binder is that the surfaces of the microspheres become coated with the metal during mixing. The mixture is then heated to cure the binder and then sintered. The thermocurable binders which may be used in this invention include organic, inorganic or organometallic compounds which are curable at temperatures ranging from room temperature to 350°C. The organic binders include thermocurable resins such as silicone resins, phenolic resins, furfural and furfuryl alcohol resins, epoxy resins, unsaturated polyester resins. Suitable inorganic binders include, hydrated potassium silicate, hydrated lithium silicate, and polymers of ethyl silicate. Preferred as the organometallic binders are low polymers of alkyl titanates, aluminum alkoxides, etc. These thermocurable binders are preferably selected according to the nature of the material constituting the hollow microspheres. For example, organic binders are preferably employed when the hollow microspheres are composed of a carbonaceous material. The inorganic binders are preferably employed when the hollow microspheres are composed of a ceramic material. Organo metallic compounds are preferably employed when the hollow microspheres are composed of a metal. The thermocurable binders are used in sufficient amounts of that when the mixture is shaped under pressure, cured by heating and then sintered, the structure of the shaped article is maintained. Care should be taken as the use of an excess of the binder because an excess will cause deterioration of the strength and appearance of the shaped articles. The quantity of the binder is generally selected within the range of 2–15 volume percent based on the mixture of the metal and the hollow microspheres. When the binder is mixed together with the metal and the hollow microspheres, a volatile liquid may be added to facilitate mixing of these materials and shaping of the mixture under pressure, and to increase the pack density. Liquid which may be used for such a purpose include ordinary organic solvents such as aliphatic hydrocarbons, alkyl ethers, alkyl esters and alcohols when the binder is an organic compound or organometallic compound. In the event an inorganic binder is used, water and alcohols are preferred. These volatile liquids are removed in the subsequent heating step. The resulting mixture of the metal and the granular hollow microsphere or mixture of the metal, hollow microsphere and the thermocuralbe binder is then subjected to shaping under pressure and to sintering.

For the shaping and sintering treatments, it is advantageous to use a pressure shaping apparatus provided with an external or internal heating device. The pressure used during the shaping treatment is preferably within the range of 10–200 kg./cm². When the granualr hollow microspheres have a low hydrostatic pressure-resisting strength are used, however, it is desirable to apply only low pressures to prevent the hollow microparticles from collapsing. The volume of the mixture charged into the shaping apparatus shrinks as the mixture is heated to sinter the metal contained therein. Thus, it is necessary to continuously adjust the shaping pressure. The sintering is effected by high frequency heating of the molding die when external heating is adopted or by passing an electric current directly through the mixture within the molding dies or discharge when internal heating is adopted. In the case of internal heating, ceramic or carbonaceous molding dies are preferred.

When the mixture to be sintered is composed of metal, hollow microspheres and thermocurable binder, the mixture is charged into an ordinary metal die and molded under pressure of 10–200 kg./cm². After molding, the mixture is heated for 5 minutes to 24 hours usually at a temperature of 100°–300°C. to effect curing of the binder contained therein. The molding and curing steps can be effected at the same time if desired. The curing may be conducted at a constant temperature or by a gradual elevation of the temperature. The molded and cured shaped article is then heated to a temperature sufficient to sinter the metal. The sintering treatment is carried out by heating the article for 5–60 minutes in a furnace kept at a temperature above 500°C., preferably at 700°–1,000°C. When the hollow microspheres are composed of a carbonaceous material, it is preferable to perform the sintering treatment in an atmosphere of argon, hydrogen or helium.

The sintering treatment produces a porous lightweight metal composite material. The lightweight metal composite material obtained according to this invention has a structure wherein the hollow microspheres are homogeneously dispersed in the metal continuous phase. The metal composites of the present invention are extremely lightweight due to their porosity and possess excellent strength, thermal-insulating properties and sound-proof properties. Thus, the porous lightweight metal composite material of this invention is useful, as described above, not only for curtain wall, soundproof material and thermal-insulating material in sky scrapers but also as structural material for aircrafts, automobiles and other vehicles in a wide variety of fields.

This invention will be explained in more detail by way of the following examples. It is to be noted that these examples are only for illustration and are not intended to limit the scope of this invention.

EXAMPLE 1

Using a small Henshell mixer in argon atmosphere, 3.9 g. of carbonaceous hollow microspheres having a mean diameter of 100 $\mu$, a bulk density of 0.12 g./cc and a hydrostatic pressure-resisting strength of about 50 kg./cm² were mixed homogeneously with 28 g. of spherical aluminum powders having a mean diameter of 35$\mu$ (with fresh surface) and 14 g. of flaky aluminum powders having a mean diameter of 20$\mu$ (with fresh surface).

The mixture was immediately charged into a small hot press equipped with a high frequency heating device (a sample compartment of which was 30 mm in diameter and 150 mm in height and filled with argon) and sintered by heating at 700°–750°C. for 30 minutes under a molding pressure of 50 kg./cm². The apparent density of the resulting porous composite material was 1.2 (g./cc). The composite material had excellent strength in spite of its very light weight.

The compressive strength and modulus of compressive elasticity of the composite material thus obtained were 7,000 psi and 300 × 10³ psi respectively.

EXAMPLE 2

The same carbonaceous hollow microspheres as those described in Example 1 were treated with a saturated solution of zinc chloride in acetone at room temperature for 30 minutes, dried under vacuum then, mixed with aluminum powders in a similar manner as described in Example 1 and sintered. This case a composite material having excellent strength and having an apparent density of 1.2 (g./cc) was obtained by heating at 700°–750°C. for 30 minutes under a molding pressure of 50 kg./cm².

The compressive strength and modulus of compressive elasticity of the composite material thus obtained were 7,200 psi and 326 × 10³ psi respectively.

EXAMPLE 3

5.5 Grams of hard glass hollow microspheres having a mean diameter of about 60 $\mu$, a bulk density of 0.21 g./cc, a particle density of 0.42 (g./cc) and a hydrostatic pressure-resisting strength of 40 kg./cm² were treated at 350°C. for 20 minutes with a molten mixture of zinc chloride and sodium chloride (80:20 weight ratio) to activate the surface of the particles, and then mixed in a small Henshell mixer homogeneously with 28 g. of spherical aluminum powders having a mean diameter of 35 $\mu$ and 14 g. of flaky aluminum powders having a mean diameter of 20 $\mu$ in a similar manner as described in Example 1.

The mixture was then sintered by heating at 700°–750°C. for 30 minutes under a molding pressure of 40 kg./cm² in a similar manner as described in Example 1. The product was a lightweight composite material having an apparent density of 1.55 (g./cc) and excellent strength.

The compressive strength and modulus of compressive elasticity of the composite material thus obtained were 6,100 psi and 250 × 10³ psi respectively.

EXAMPLE 4

The same carbonaceous hollow particles as those used in Example 1 were coated with copper to about 1 $\mu$ thickness by a non-electrolytic plating process to give hollow microspheres having a bulk density of 0.28 g./cc and a particle density of 0.44 (g./cc). The particles were further treated with a fused mixture of sodium fluoride and aluminum fluoride (36:64 weight ratio) to activate the surface of the particles. 42 grams of aluminum cylindrical pellets (0.7 mm in diameter and 0.7 mm in height) with a purity over 99.9 percent were charged into a 200 ml. stainless autoclave and heated with stirring with an alumina-coated stirring propeller to fuse the aluminum. After fusion, 10 g. of the hollow microspheres were added and heating was continued at the melting temperature for 30 minutes with rapid stirring. The mixture was then slowly cooled below 200°C. and taken out of the autoclave in the form of fine granular hollow particles with the hollow microsphere coated almost uniformly with aluminum.

These hollow particles were placed in a graphite mold (a cylindrical form of 12 mm in diameter and 50 mm in height) of which the top and the bottom were covered with graphite disks. The mold was placed between opposing pistons and a direct current of 5V, 2,000A and a high frequency current of 5V, 300A, 1,000 c/s were sent to cause discharge under compression of 70 kg./cm² whereby heating and sintering were effected. The resulting porous composite material was found to have an apparent density of 1.35 (g./cc) and excellent strength.

The compressive strength and modulus of compressive elasticity of the composite material thus obtained were 7,800 psi and 340 × 10³ psi respectively.

EXAMPLE 5

3.5 Grams of granular carbonaceous hollow microspheres having a means diameter of 100 $\mu$, a bulk density of 0.12 g./cc a particle density of 0.20 (g./cc) and a hydrostatic pressure-resisting strength of about 50 kg./cm², 11 g. of flaky aluminum powders having a purity over 99.0 percent and a mean diameter of 35 $\mu$, a thermocurable silicone varnish (KR 255, a product of Shin-etsu Kagaku K.K.) and toluene were mixed homogeneously in a small Henshell mixer. The mixture was molded into a plate of 10 mm in thickness in a metal mold press under a pressure of up to 50 kg./cm². The molded plate was heated for 4 hours in an oven kept at 250°C. to effect complete curing of the silicone varnish and removal of toluene at the same time. This plate was sintered by heating at 750°C. for 30 minutes in an electric furnace in argon atmosphere to give an aluminum composite material having a density of 1.2 (g./cc) and excellent strength.

The compressive strength and modulus of compressive elasticity of the composite material thus obtained were 6,000 psi and 250 × 10³ psi respectively.

EXAMPLE 6

4.6 Grams of hard glass hollow microspheres having a mean diameter of 60 $\mu$, a bulk density of 0.21 g./cc, a particle density of 0.42 (g./cc) and a hydrostatic pressure-resisting strength of 40 kg./cm², 11 g. of flaky aluminum powders having a purity over 99.0 percent and a mean diameter of 20 $\mu$, 22 g. of spherical aluminum powders having a purity over 99.0 percent and a mean diameter of 35 $\mu$ and 6 g. of a low polymer of ethyl silicate (Ethyl Silicate 40, a product of Nippon Korukoto Chemicals Co.) were mixed homogeneously in a Henshell mixer. The mixture was molded in a metal mold press into a plate of 8 mm in thickness under a pressure of 40 kg./cm². The molded plate was heated for 4 hours in an oven kept at 250°C. to effect curing of ethyl silicate and complete removal of volatile degradation products, and then heated further at 750°C. for 1 minutes in an electric furnace to give a composite material having a density of 1.5 (g./cc) and excellent strength.

The compressive strength and modulus of compressive elasticity of the composite material thus obtained were 5,100 psi and 210 × 10³ psi respectively.

EXAMPLE 7

Carbonaceous hollow microspheres of the type used in Example 1 were coated with copper about 1 $\mu$ in thickness by a non-electrolytic plating process. The bulk density and a particle density of the copper-plated granular hollow microsphere were 0.28 g./cc and 0.44 g./cc, respectively.

8.5 Grams of the copper coated microspheres, 11 g. of flaky aluminum powders of the type previously described, 22 g. of spherical aluminum powers and 5 g. of a low polymer of butyl titanate were mixed homogeneously in a Henshell mixer and molded in a metal mold press into a plate of 9 mm in thickness under a pressure of 100 kg./cm². The molded plate was heated at 250°C. for 5 hours to effect complete curing of the binder and then sintered by heating further at 750°C. for 30 minutes in a furnace in an argon atmosphere to give a composite material having a density of 1.3 (g./cc) and excellent strength.

The compressive strength and modulus of compressive elasticity of the composite material thus obtained were 6,500 psi and 290 × 10³ psi respectively.

We claim:

1. A porous lightweight metal composite obtained by molding and sintering a mixture comprising a metal selected from the group consisting of aluminum, aluminum-base alloys and magnesium base alloys, and a plurality of hollow microspheres being composed of a material capable of withstanding the sintering temperature of the metal, said metal composite having said hollow microspheres homogeneously dispersed in a continuous phase of said metal.

2. The porous lightweight metal composite of claim 1 wherein said hollow microspheres are formed of a material selected from the group consisting of carbon, graphite, glass, silica, aluminum, copper, nickel and iron.

3. The metal composite of claim 1 wherein the ratio of said metal to said hollow microspheres is at least 15:85 by volume.

4. The composite of claim 1 wherein said material of said microspheres is carbon.

5. A process for the production of a porous lightweight metal composite comprising:
   coating a plurality of non-metallic hollow microspheres with a metal;
   forming a mixture comprising a metal selected from the group consisting of aluminum, aluminum-base alloys and magnesium-base alloys and said non-metallic hollow microspheres composed of a material capable of withstanding the sintering temperature of said metal; and
   sintering and shaping said mixture in a mold by application of heat and pressure.

6. The process of claim 5 wherein the ratio of said metal to said hollow microspheres is at least 15:85 by volume.

7. The process of claim 5 wherein said pressure is within the range of 10–200 kg/cm$^2$.

8. The process of claim 5 wherein said non-metallic microspheres are carbon.

9. The process of claim 5 wherein the mixture further comprises a thermocurable binder.

* * * * *

UNITED STATES PATENT OFFICE
CERTIFICATE OF CORRECTION

Patent No. 3,781,170  Dated December 25, 1973

Inventor(s) Masaaki Nakao et al.

It is certified that error appears in the above-identified patent and that said Letters Patent are hereby corrected as shown below:

In the ABSTRACT, line 11, "surface" should read -- surfaces --. Column 1, line 62, "described above" should read -- previously mentioned --; line 66, ",", first occurrence, should read -- . --. Column 2, line 4, before "preferred" insert -- are --; Column 3, line 16, "Organo metallic" should read -- Organo-metallic --. Column 4, line 63, delete "This case a" and insert -- A --. Column 5, line 65, "means" should read -- mean --. Column 6, line 35, "1" should read -- 15 --.

Signed and Sealed this sixteenth Day of December 1975

[SEAL]

Attest:

RUTH C. MASON
Attesting Officer

C. MARSHALL DANN
Commissioner of Patents and Trademarks